F. TRUMP.
BEARING FOR WATER WHEELS.
APPLICATION FILED AUG. 28, 1907.
993,420.
Patented May 30, 1911.
2 SHEETS—SHEET 1.
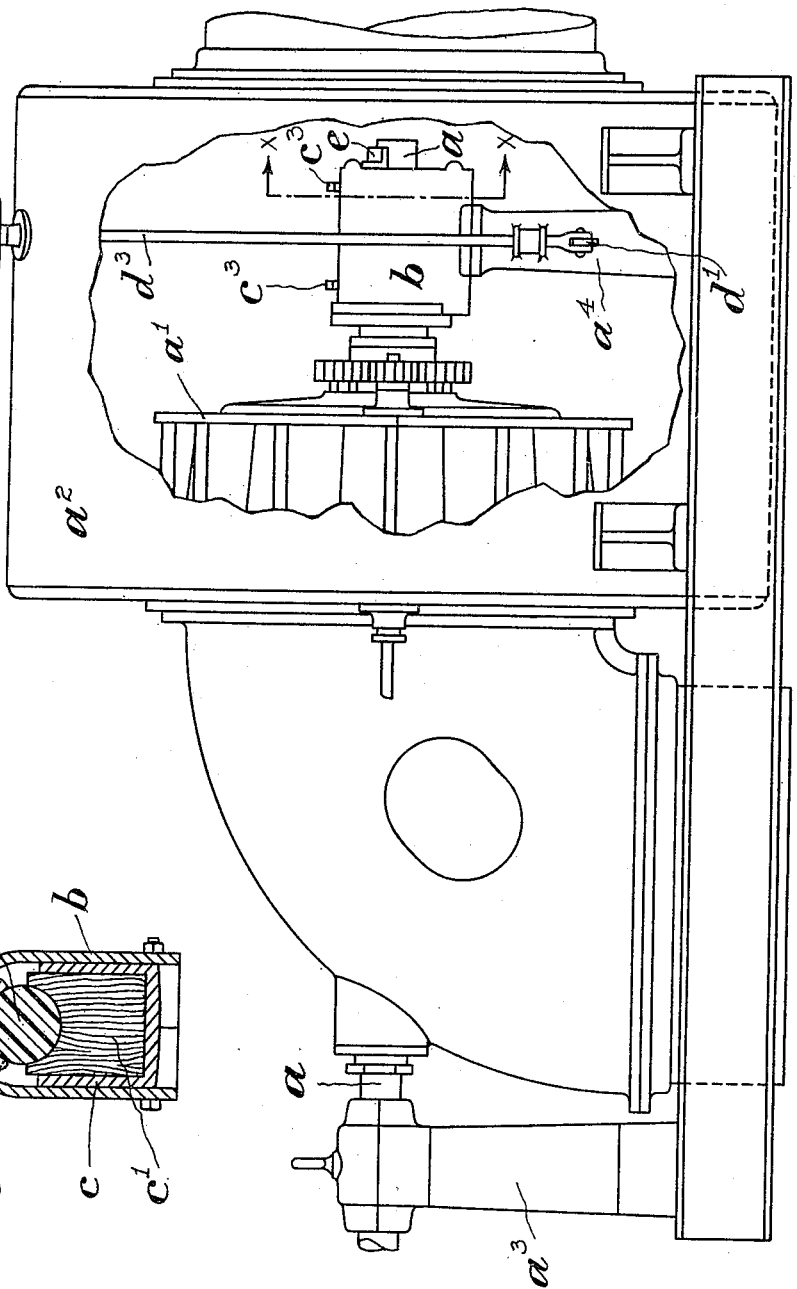
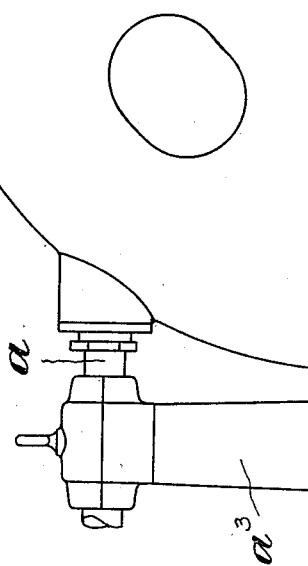
Witnesses
Chas. I. Welch
Mary Hall
Inventor
Fuller Trump
By Whitney M. Bowman
Attorneys F. TRUMP.
BEARING FOR WATER WHEELS.
APPLICATION FILED AUG. 28, 1907.
993,420.
Patented May 30, 1911.
2 SHEETS—SHEET 2.
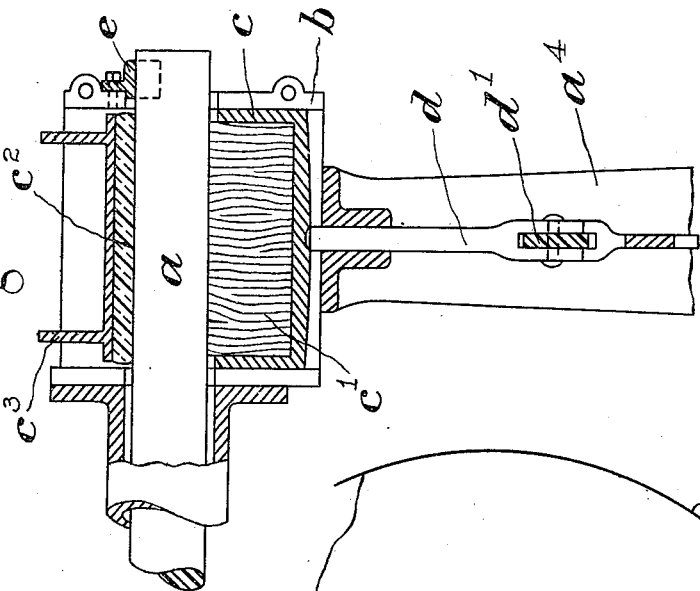
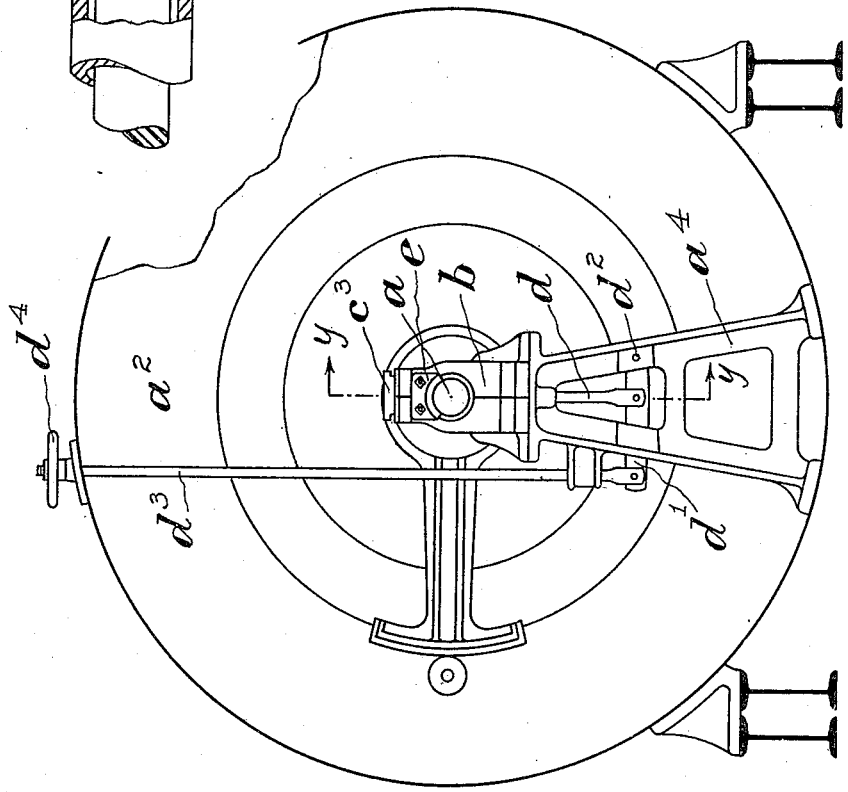
Witnesses
Chas. F. Welch
Mary Hall
Inventor
Fuller Trump
By Staley M. Bowman
Attorneys

UNITED STATES PATENT OFFICE.

FULLER TRUMP, OF SPRINGFIELD, OHIO, ASSIGNOR TO PAUL A. STALEY AND J. F. TRUMP, BOTH OF SPRINGFIELD, OHIO, RECEIVERS OF TRUMP MANUFACTURING COMPANY, OF SPRINGFIELD, OHIO, A CORPORATION.

BEARING FOR WATER-WHEELS.

993,420.   Specification of Letters Patent.   Patented May 30, 1911.

Application filed August 28, 1907. Serial No. 390,552.

*To all whom it may concern:*

Be it known that I, FULLER TRUMP, a citizen of the United States, residing at Springfield, in the county of Clark and State of Ohio, have invented certain new and useful Improvements in Bearings for Water-Wheels, of which the following is a specification.

My invention relates to improvements in adjustable bearings and especially to bearings adapted for use with horizontal shafts which run in water, such as water-wheels and similar shafts.

When water-wheels are mounted on horizontal shafts and such shafts are employed in pen-stocks or other places so as to run in water, difficulty is experienced with the shafts getting out of line from wear on the portion of the bearing which supports the shaft, and adjustable bearings are usually employed to take up the wear, but some difficulty is experienced in bringing them into exact alinement.

To provide for easily and readily adjusting the bearings of shafts of this character, and also to bring them into alinement by the simple act of adjustment, is the object of this invention.

The invention consists in the constructions and combinations of parts hereinafter described and set forth in the claims.

In the accompanying drawings, Figure 1 is a side elevation of a turbine water wheel in which my invention has been embodied. Fig. 2 is an end view of the same, looking toward the left of Fig. 1. Fig. 3 is a detail vertical sectional view of the bearing, the section being on the line $x$ $x$ of Fig. 1. Fig. 4 is a longitudinal sectional view of the same, the section being on the line $y$ $y$ of Fig. 2.

Like parts are represented by similar letters of reference in several views.

In the said drawings, $a$, represents the shaft of a turbine water wheel, $a^1$, of a well known type, mounted in the usual way in a pen-stock, $a^2$, the bearings for the shaft being supported on supporting standards, $a^3$, $a^4$, the one, $a^4$, being located within the said pen-stock.

It will be understood that the shaft bearing in the pen-stock is under water and it has been common to provide means outside of the pen-stock for adjusting this bearing. Difficulty has been experienced, however, in bringing the shaft to proper alinement in the bearing and it is to overcome this difficulty that I have devised the present construction. The bearing proper consists of a two-part box, $b$, mounted upon the standard, $a^4$, the respective parts of this box being bolted together as shown. Within the box is a movable casing, $c$, having a bearing block, $c^1$, of any suitable and usual material, wood preferred, upon which the shaft, $a$, runs. The box, $b$, is open at the top to receive, if desired, suitable lubricant, $c^2$, and the usual follower, $c^3$. This movable casing is adapted to rest upon a vertical rod, $d$, which extends through the bottom of the box, $b$, and is preferably rounded at the bearing point of the casing so as to permit the free movement of the casing thereon. The lower end of the rod, $d$, is pivotally connected to a lever, $d^1$, one end of the lever being pivoted to the supporting standard, as at $d^2$, and the other connected to a rod, $d^3$, which has an adjusting nut, $d^4$. Bolted to the outside of the box, $b$, is the alining device in the nature of a block, $e$, shaped to conform to the shaft $a$, and adapted to extend part way around the same, the block being preferably formed of bronze or any other non-corrosive material.

By the construction described it will be seen that by turning the adjusting nut the bearing-block will be, through the medium of the intermediate parts, moved upwardly, thus carrying the shaft upwardly until it contacts with the alining block, $e$. This may be determined by the action of the adjusting nut in the hand of the operator. As soon as a shaft has been brought tightly against this alining block, the adjusting nut is backed off, say, one turn, which is sufficient to take away any frictional contact between the alining block and the shaft but to bring it into perfect alinement. The alining block, $e$, it will be understood, is simply a means for bringing the shaft into alinement and forms no part of the bearing-block proper.

Having thus described my invention, I claim—

1. In a bearing, a shaft, a box, a movable bearing-block for said box, means for adjusting said bearing-block and a fixed alining block of harder material than the movable bearing block secured to said box and located in the line of movement of said shaft when moved by said movable bearing-block, substantially as specified.

2. In a bearing, a shaft, a box, an adjustable bearing-block in said box for said shaft of fibrous material, and a fixed alining block of different material from the bearing block secured to the outside of said box and located in the line of movement of said shaft when adjusted by said bearing-block, substantially as specified.

3. In a bearing, a shaft, a box, an adjustable bearing block in said box for said shaft, and means for moving said block and said shaft and a fixed alining block of harder material than said block and on the opposite side of said shaft from said movable block, said alining block being normally out of contact with said shaft but adapted to limit the shaft when moved by said adjusting bearing block, substantially as specified.

In testimony whereof, I have hereunto set my hand this 19th day of August 1907.

FULLER TRUMP.

Witnesses:
CHAS. I. WELCH,
MARJORIE S. MORROW.

---

Copies of this patent may be obtained for five cents each, by addressing the "Commissioner of Patents, Washington, D. C."